(12) United States Patent
Becker et al.

(10) Patent No.: US 8,389,774 B2
(45) Date of Patent: Mar. 5, 2013

(54) PARALLELIZED JET LOOP REACTORS

(75) Inventors: Marc Becker, Dortmund (DE); Robert Franke, Marl (DE); Wilfried Bueschken, Haltern am See (DE); Armin Boerner, Rostock (DE); Jens Holz, Kessin (DE)

(73) Assignee: Evonik Oxeno GmbH, Marl (DE)

( * ) Notice: Subject to any disclaimer, the term of this patent is extended or adjusted under 35 U.S.C. 154(b) by 204 days.

(21) Appl. No.: 13/059,355

(22) PCT Filed: Jul. 9, 2009

(86) PCT No.: PCT/EP2009/058711
§ 371 (c)(1),
(2), (4) Date: Feb. 16, 2011

(87) PCT Pub. No.: WO2010/023018
PCT Pub. Date: Mar. 4, 2010

(65) Prior Publication Data
US 2011/0144391 A1    Jun. 16, 2011

(30) Foreign Application Priority Data

Aug. 28, 2008  (DE) .................. 10 2008 041 652

(51) Int. Cl.
*C07C 45/50*  (2006.01)
*B01J 14/00*  (2006.01)
(52) U.S. Cl. .................. 568/429; 568/451; 422/600
(58) Field of Classification Search .................. 568/429, 568/451; 422/600
See application file for complete search history.

(56) References Cited

U.S. PATENT DOCUMENTS 7,611,683 B2    11/2009  Grund et al.

FOREIGN PATENT DOCUMENTS

| | | |
|---|---|---|
| DE | 198 57 409 | 6/2000 |
| FR | 1 503 643 | 12/1967 |
| WO | 2009 024446 | 2/2009 |

OTHER PUBLICATIONS

International Search Report issued Sep. 28, 2009 in PCT/EP09/058711 filed Jul. 9, 2009.

*Primary Examiner* — Sikarl Witherspoon
(74) *Attorney, Agent, or Firm* — Oblon, Spivak, McClelland, Maier & Neustadt, L.L.P.

(57) ABSTRACT

The invention relates to a device and a method for the continuous reaction of a liquid and a second fluid, wherein the device comprises at least two jet loop reactors interconnected in parallel and common outer liquid recirculation.

12 Claims, 7 Drawing Sheets

PARALLELIZED JET LOOP REACTORS

The invention relates to a device for the continuous reaction of a liquid with at least one other fluid.

A liquid is an essentially incompressible fluid medium. A gas is a compressible fluid medium. A fluid is either a liquid or a gas. An optionally powdered solid, fluidized in particular by means of a gas, is likewise a fluid in the sense of the invention.

In the scope of the present invention, a supplied liquid is intended to mean a substance or substance mixture which exists in the liquid aggregate state in the apparatus under reaction conditions and comprises at least one reactant. A gas is intended to mean a pure gas or a gas mixture, which comprises at least one reactant and optionally an inert gas. An example of a gas which comprises two reactants is synthesis gas consisting of hydrogen and carbon dioxide, which is used for example in hydroformylation.

Figure 1A:
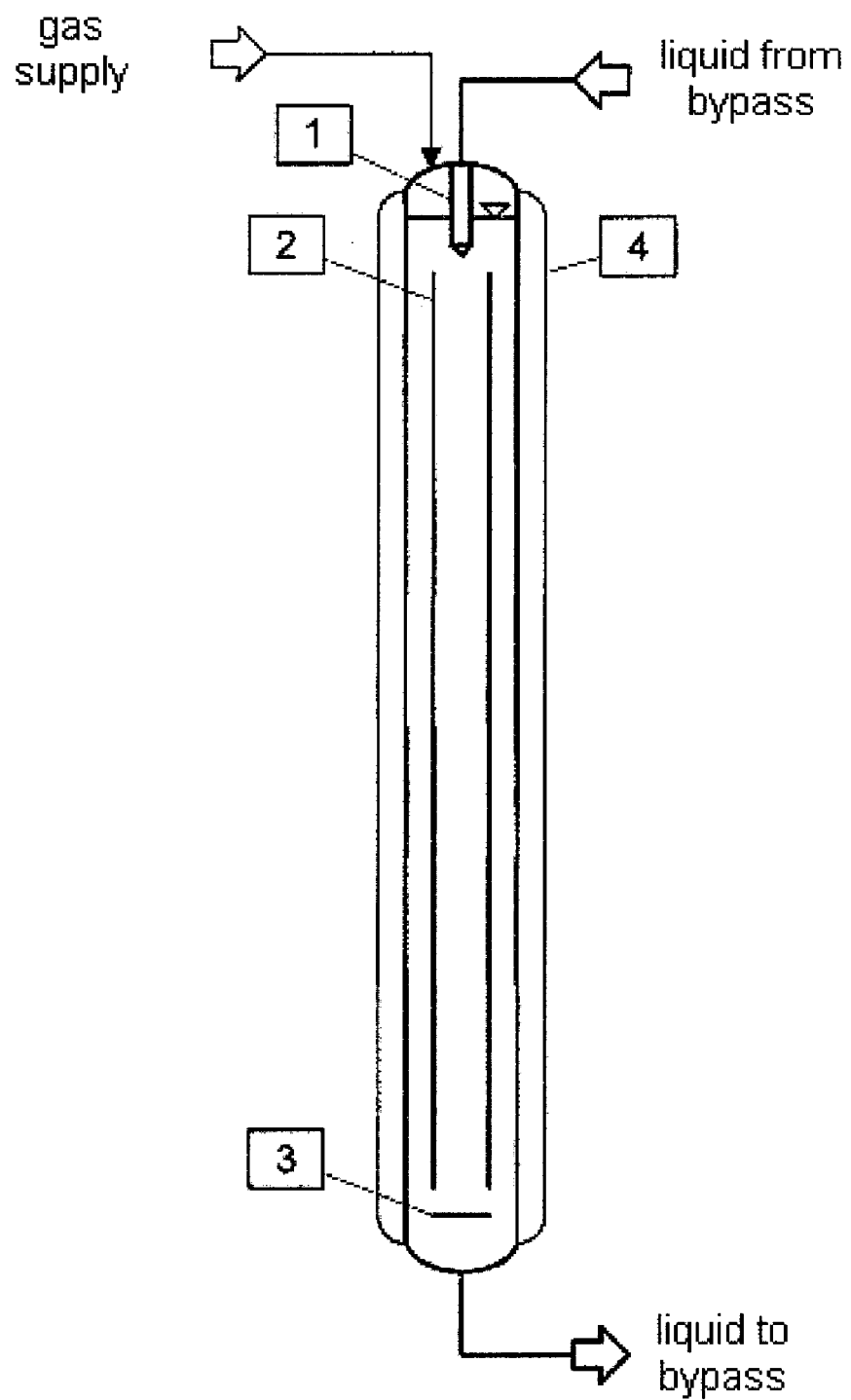
Figure 1B:
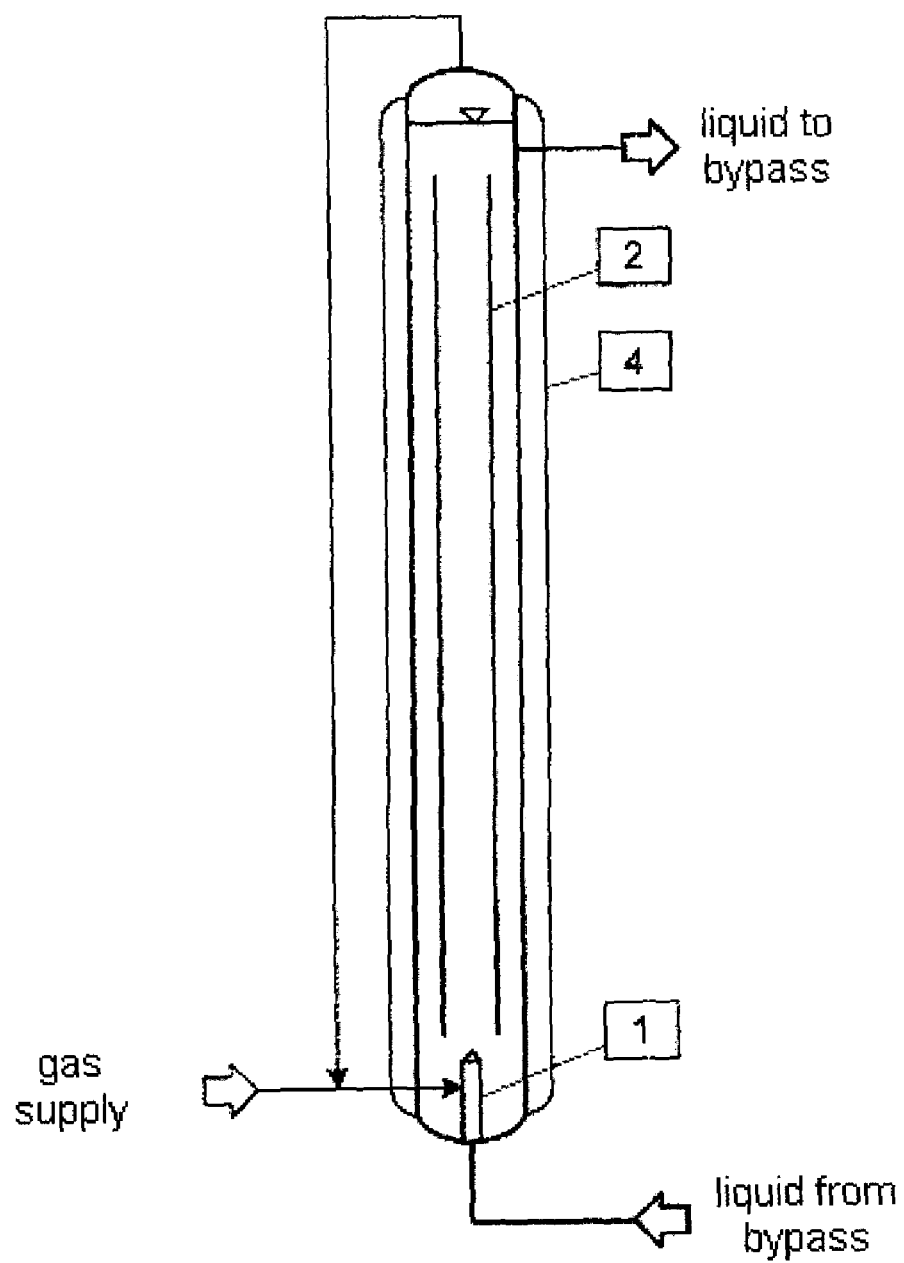

A jet loop reactor in the sense of the invention is a device for the continuous reaction of a liquid with at least one other fluid, in which the liquid enters under pressure through a nozzle into a reaction space, flows along this in a primary flow direction, is deflected at the opposite end of the reaction space from the nozzle, flows back against the primary flow direction and is accelerated in the primary flow direction, so that a liquid circuit (loop) is set up inside the reactor space. The second fluid is entrained by the liquid flow and reacts on the way along the loop. The liquid is therefore used as a driving jet medium. In order to impart kinetic energy to the liquid, the reaction space is provided with outer liquid recirculation in which a part of the liquid is fed in a circuit outside the reaction space. Inside the outer fluid recirculation, a pump is provided which provides the liquid stream with the kinetic energy required to establish the loop flow inside the reactor. The nozzle is correspondingly supplied from the outer circuit. Known jet loop reactors are represented in FIGS. 1a and 1b.

A good introduction to the technology of jet loop reactors may be found in:
P. Zehner, M. Krause: "Bubble Columns", Ullmann's Encyclopedia of Industrial Chemistry, Electronic Release, 7th ed., Chapter 4, Wiley-VCH, Weinheim [2005].

In order to carry out multiphase reactions efficiently in gas/liquid or gas/liquid/liquid systems, intensive mixing of the relevant phases is of the utmost importance so as to avoid the mass transport limitations. In engineering terms, this is achieved by a number of very different reactor concepts ranging from stirred tanks through bubble columns and packed columns to tube reactors with static mixers [K. Schügerl: "Neue Bioreaktoren für aerobe Prozesse" (new bioreactors for aerobic processes); Chem.-Ing.-Tech. 52, (12), 1980, 951-965]. The disadvantage of these systems resides in their sometimes comparatively low volumetric mass transfer coefficients (kLa).

Various reactor concepts have been developed in order to improve the mass transfer, especially in multiphase catalysis, all of which are characterized by high circuit flow rates [E. H. Stitt: "Alternative multiphase reactors for fine chemicals—A world beyond stirred tanks?" Chem. Eng. J. 90, 2002, 47-60]. These generate the required mass exchange surfaces by means of appropriate mixing devices such as nozzles or orifices. Special reactors based on multi-component nozzles have already been investigated at length [N. Räbiger: "Hydrodynamik and Stoffaustausch in strahlangetriebenen Schlaufenreaktoren" (hydrodynamics and mass exchange in jet-driven loop reactors); Praxiswissen Verfahrenstechnik: Thermische Verfahrenstechnik, Verlag TÜV Rheinland GmbH, Cologne, 1988] and used successfully in a prototype hydroformylation system, as described in DE 198 36 807. The reactor is distinguished by high space-time yields and mass transfer rates between the gas and liquid phases. It furthermore obviates the circuit compressor conventionally required for the gas recycling, since unreacted gas is redispersed into the liquid again through the nozzle in the reactor. The gas content in the reactor can be selected freely through the filling level and the relative position of the gas intake of the nozzle, and filling level control is therefore not required. The large circulation flow rates occurring inside the reactor furthermore permit operation virtually without gradients.

In a single jet loop reactor, the height/diameter ratio can in this case be varied only in a narrow range of from 3 to 10, in order to ensure sufficient reaction volumes with tolerable reactor installation heights. The mixing behaviour and the mass transfer are then detrimentally affected by the squat design, which can be compensated for only to a limited extent by the provision of a plurality of nozzles and guide tubes in a reactor [Y. Gan et al.: "Studies on configuration of jet loop reactors with low height-diameter ratio"; Chem. Reac. Eng. Tech. 15 (3), 1999, 268-274]. Furthermore, the heat dissipation becomes increasingly worse owing to the small surface area-volume ratio. This may necessitate the use of field tubes inside the reactor in order to increase the heat exchange area, as described for instance in DE 198 54 637, which entails a higher design outlay besides compromising the internal circulation flow.

Reactors with a slenderness ratio (ratio of the reactor height (H) to the reactor diameter (D)) H/D>10 permit comparatively sizeable gas contents, but are unsuitable for a scale-up owing to the small volumes. Because of the resulting reactor height, enlarging the reactor to relevant reaction volumes leads to increasingly great internal pressure losses and therefore superproportionally high energy dissipation, which causes a considerable deterioration of the reactor performance. Owing to the small diameter, however, sufficient heat exchange performance cannot be achieved here without installing additional components.

Owing to the above-described disadvantages of the known engineering reactors, it is an object of the invention to provide a reactor or an arrangement of reactors for continuous fluid/liquid reaction with a viable performance profile.

The object is achieved by the subject-matter of claim 1.

The invention is based on the discovery that, in the continuous reaction of a liquid with another fluid, the benefits of a jet loop reactor can be exploited even for high production capacities by parallel connection of jet loop reactors.

The present invention therefore provides a device for the continuous reaction of a liquid with another fluid, which comprises at least two jet loop reactors interconnected in parallel and common outer liquid recirculation.

The invention also provides a method for the reaction of a liquid with another fluid, at least one gaseous reactant being reacted with at least one liquid reactant, which is carried out in the device according to the invention.

The device according to the invention has the advantage that the benefits of a jet loop reactor, such as intensive mass transport, high heat dissipation or heat supply, operation virtually without gradients, can be utilized for large production capacities.

Since the device has only one pump for sustaining the outer recirculation, the capital investment and the operating costs are less than for a system which consists of at least two jet loop reactors each with its own outer circuit. For this reason, an embodiment in which precisely one pump is arranged in the outer liquid recirculation is preferred.

A particularly preferred embodiment of the invention is distinguished in that an outlet for the liquid is assigned to each nozzle, in that the nozzle and the outlet are arranged diametrically in the reactor with respect to the internal liquid circuit, and in that the outer liquid recirculation connects the nozzle to the outlet. This refinement forms an outstanding flow profile.

By virtue of the common outer liquid recirculation, it is advantageously possible to provide a heat exchanger in the outer liquid recirculation in order to exchange heat between the liquid conveyed in the outer liquid circuit and a heat carrier. Internal heat exchangers may then be obviated, which improves the flow inside the reactor. The input or dissipation of heat of reaction then takes place particularly effectively.

The device according to the invention is suitable for the reaction of a liquid (as a driving medium) with at least one other fluid. Besides the driving medium, however, two or more fluids may also be reacted. The following two-phase reactions may therefore be carried out:
liquid/liquid;
liquid/gas.
Three-phase reactions may be carried out as follows:
liquid/liquid/liquid;
liquid/liquid/gas;
liquid/gas/gas.

The device according to the invention, and the method according to the invention carried out with it, will be described by way of example below. To this end:

FIG. 1a: shows a jet loop reactor with the nozzle at the top (prior art)

FIG. 1b: shows a jet loop reactor with the nozzle at the bottom (prior art)

Figure 2:
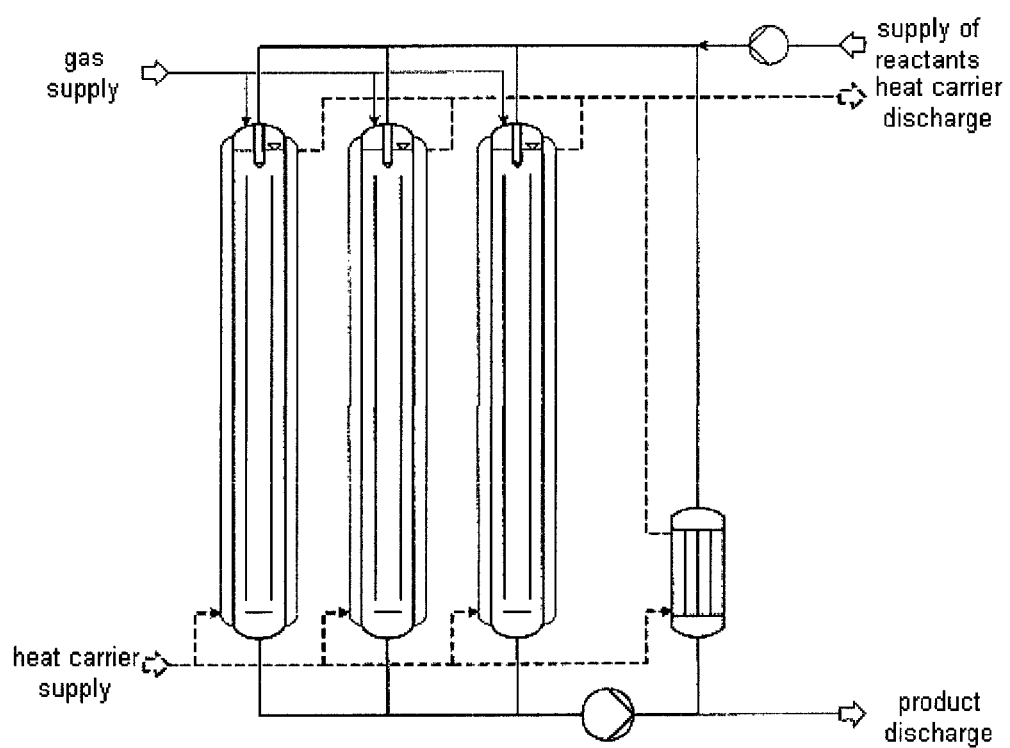

FIG. 2: shows the inventive connection of jet loop reactors

Figure 3A:
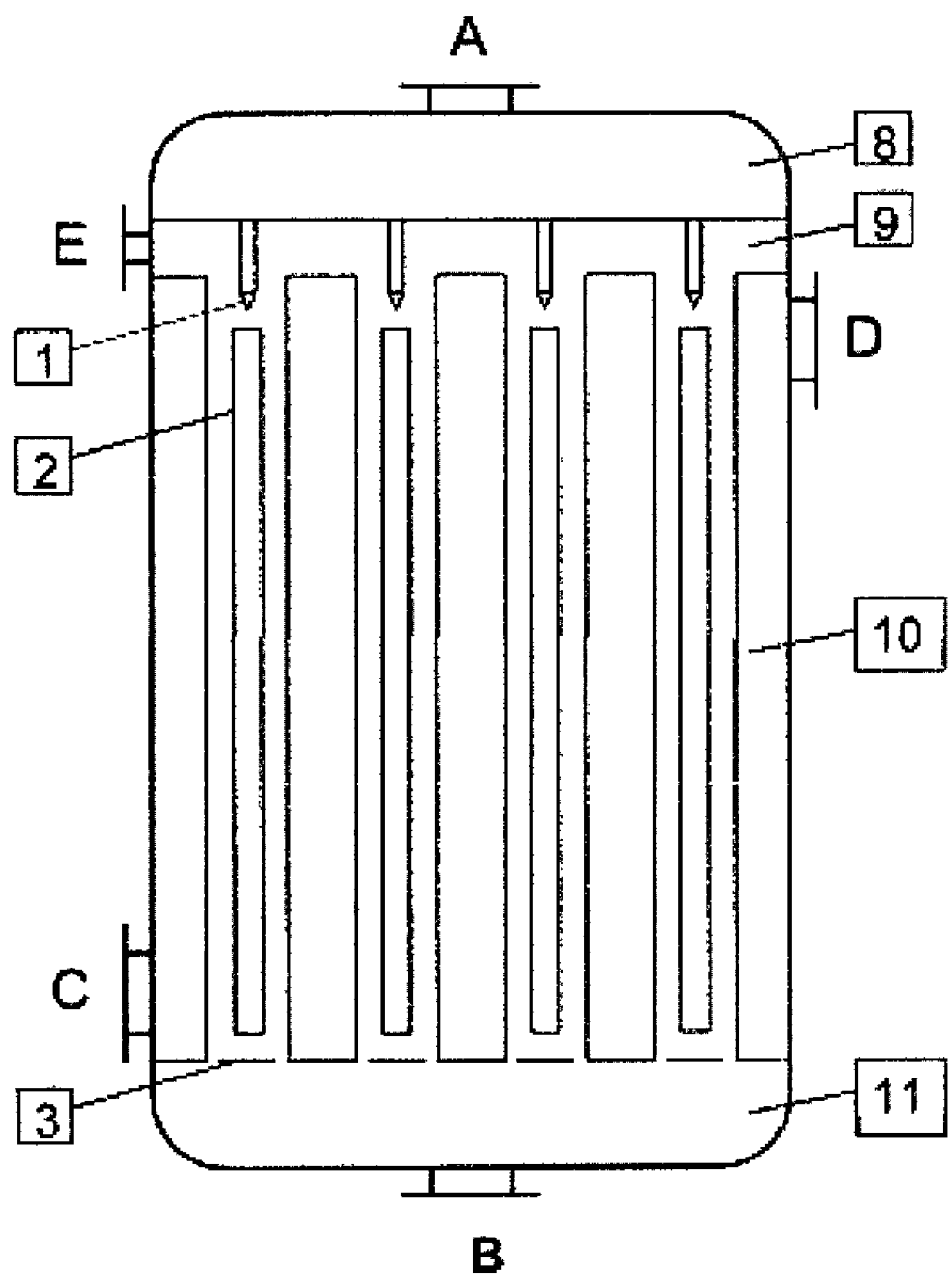
Figure 3B:
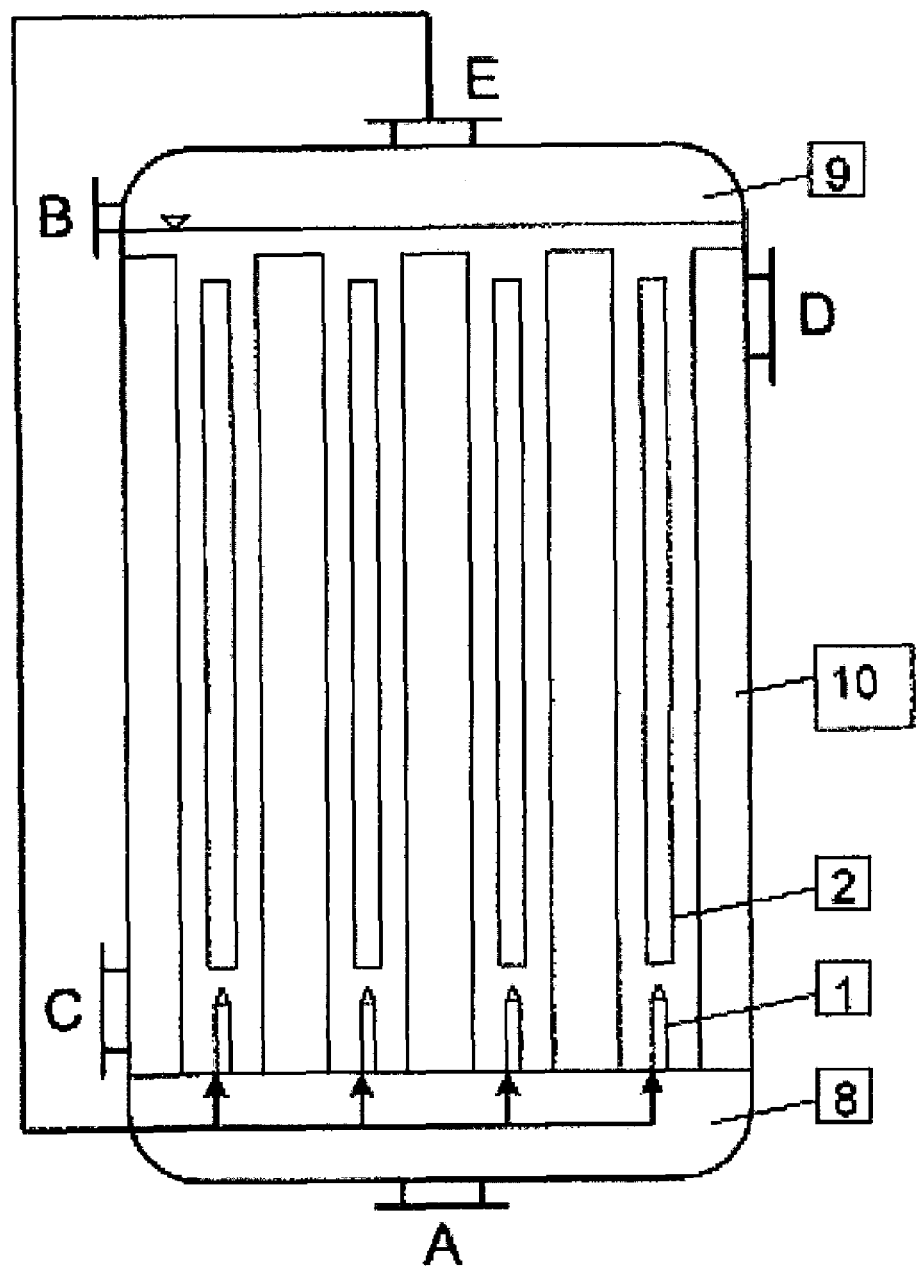
Figure 4A:
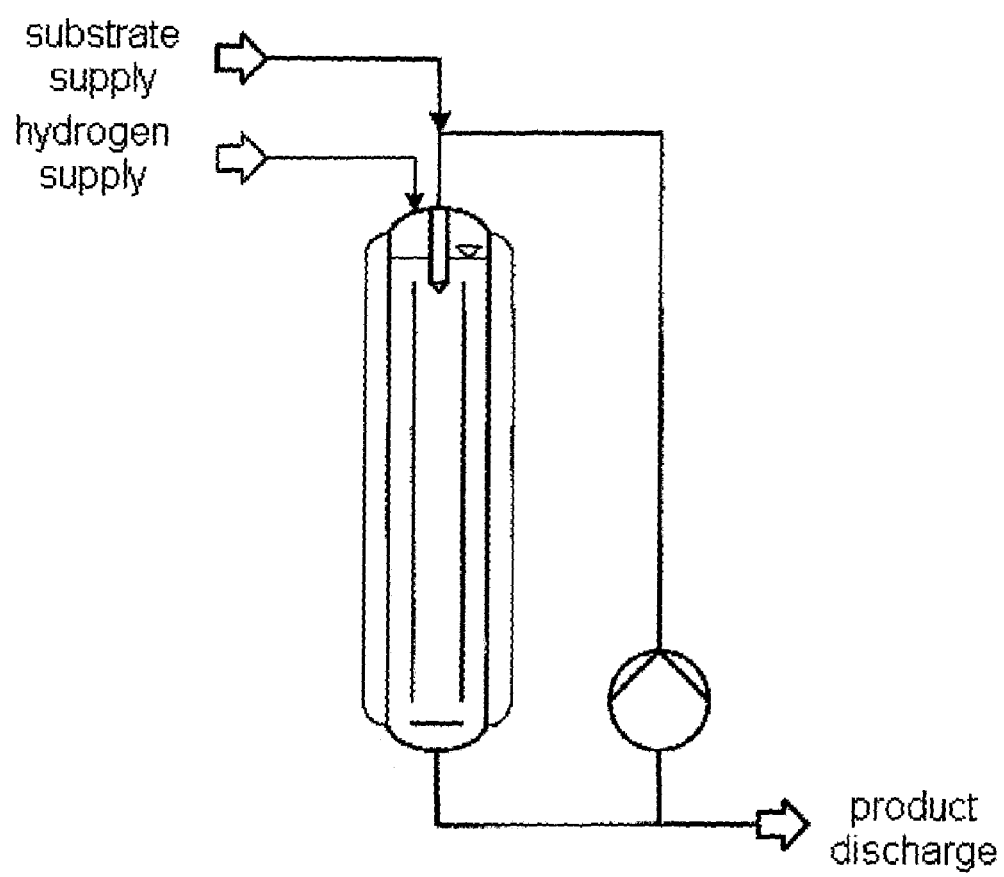

FIG. 3a: shows a parallellized embodiment of jet loop reactors as a bundle, with the nozzle at the top FIG. 3b: shows a parallellized embodiment of jet loop reactors as a bundle, with the nozzle at the bottom FIG. 4a: shows the experimental system for Example 1

Figure 4B:
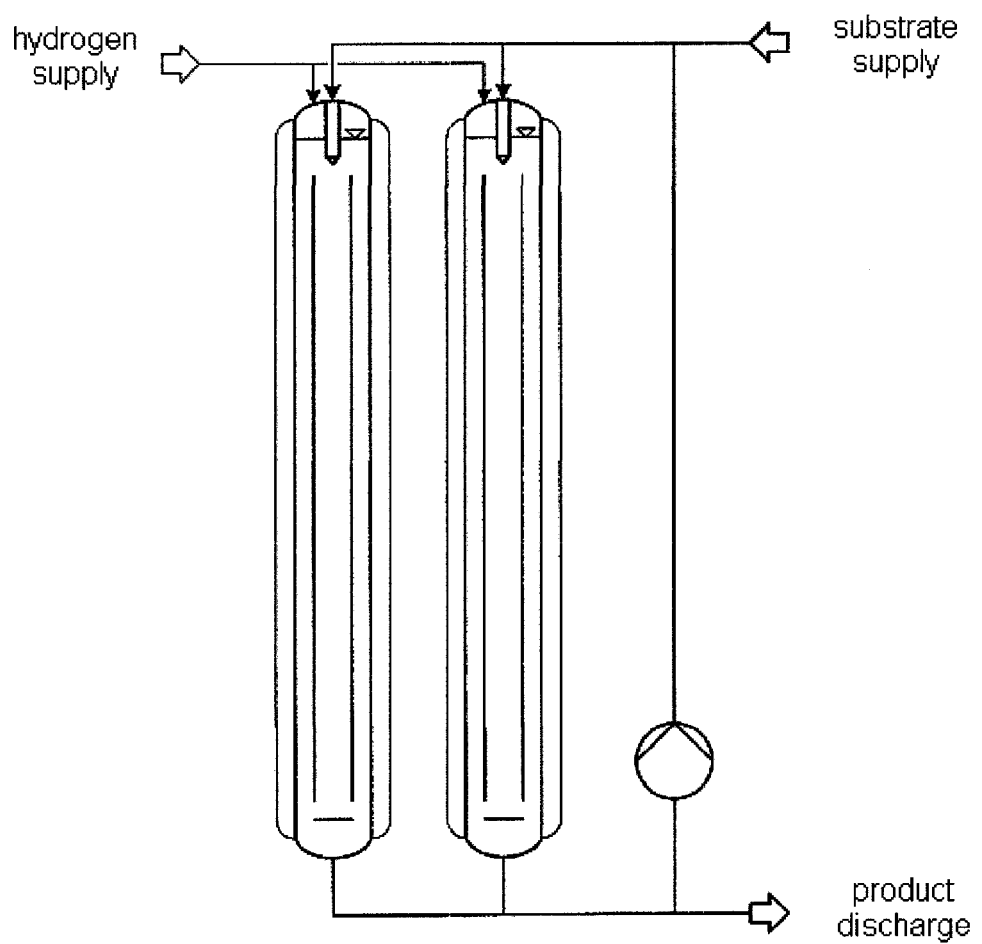

FIG. 4b: shows the experimental system for Example 2

The device according to the invention for carrying out reactions, in which a liquid is reacted continuously and in cocurrent flow with another liquid, essentially consists of two or more jet loop reactors which are interconnected in parallel and have common outer fluid recirculation.

FIG. 1a represents a conventional jet loop reactor, in which the jet nozzle lies at the top of the reactor and the educts are introduced in the upper part of the reactor. The reactor consists of a pressure tube in which a nozzle (1), a guide tube (2) and a baffle plate (3) are installed. The reactor has a heating or cooling jacket (4). A valve for removing off-gas may furthermore be installed in the upper gas space of the reactor to extract inert gas components (not shown in FIG. 1a).

The guide tube is preferably arranged concentrically with the jet nozzle and the pressure vessel. The jet nozzle may be a single- or multi-component nozzle, and in another design it may furthermore be provided separately with an impulse exchange tube and/or diffuser. During operation, the nozzle is fully or partially immersed in the reaction medium, and the immersion depth may be up to several guide tube diameters. The guide tube has a diameter of from one tenth to half of the reactor diameter and extends essentially over the entire length of the reactor; it is delimited by the baffle plate at the bottom while being provided with an appropriate spacing, and the upper end lies below the liquid surface during operation. The reactor is characterized in that only a small part of the liquid is fed back through the external recirculation to the nozzle, owing to the high internal circulation flow.

The jet loop reactors used in the device according to the invention have a high slenderness ratio (ratio of the reactor height (H) to the reactor diameter (D)). The slenderness ratio lies in the range of from 5 to 15, preferably in the range of from 8 to 12, particularly preferably in the range of 10 to 12.

Owing to the high slenderness ratio, the installation of internal heat exchangers can be obviated since sufficient heat can be input or extracted both through the cylindrical wall surface and through the heat exchanger of the outer circuit.

In a further embodiment as shown in FIG. 1b, the nozzle (1) may be arranged at the bottom of the reactor. The guide tube (2) is preferably arranged concentrically with the jet nozzle and the pressure vessel, and the jet nozzle may be embodied as a single- or multi-component nozzle. The gas is supplied under pressure. In a preferred embodiment, the gas intake occurs automatically through the ejector operation of the nozzle. The guide tube (2) has a diameter of from one tenth to eight tenths, preferably from four tenths to seven tenths of the reactor diameter, and extends essentially over the entire length of the reactor, the upper end lying below the liquid surface during operation. The reactor has a comparatively sizeable internal circulation flow, only a small part of the liquid being fed back through the external recirculation to the nozzle.

The device according to the invention consists of at least two reactors. The number of reactors preferably lies in the range of from 2 to 20, particularly preferably in the range of from 2 to 14.

The reactors may be different or, preferably, identical.

FIG. 2 shows an example of a device according to the invention, consisting of three reactors interconnected in parallel, a circulation pump and a heat exchanger in the common outer liquid recirculation, where educts are fed into the upper reaction space. Lines for removing off-gas from the upper parts of the reactors are not shown. In this representation, there is a heating or cooling circuit.

Each heat exchanger, however, may also be operated separately.

The individual reactors may be combined to form a bundle, as shown in FIG. 3.

A bundle reactor consists of at least two individual reactors. A bundle preferably has from 3 to 14 individual reactors. In a bundle reactor, the individual component reactors preferably have the same dimensions.

The device according to the invention may comprise one or more bundle reactor(s) or at least two individual reactors, or a combination of one or more bundle reactor(s) with one or more individual reactors.

In the device according to the invention, as already mentioned above, the nozzles may be arranged differently in the reactors:
a) in all the reactors, the nozzle is located in the upper part of the reactor (FIG. 3a)
b) in all the reactors, the nozzle is located in the lower part of the reactor (FIG. 3b)
c) in the reactors, at least one nozzle is installed in the lower part of a reactor and at least one nozzle is installed in the upper part of a reactor (not represented as a figure).

In all the embodiments shown, the nozzle outlet for the driving jet lies below the liquid level.

The device according to the invention may be used inter alia for the reaction of a liquid with a gas, both the gas and the liquid comprising at least one reactant.

Optionally, a liquid may be used which contains a catalyst homogeneously dissolved or in suspended form, with the proviso that its average particle size is less than 200 μm, particularly preferably less than 100 μm.

The reaction products are extracted with the gas or liquid phase, and preferably with the liquid phase.

In the apparatus according to the invention, reactions may be carried out in the pressure range of from 0.2 to 40 MPa and in the temperature range of from 0 to 350° C. The reaction preferably takes place on a catalyst homogeneously dissolved in the liquid phase.

For example oxidations, epoxidation of olefins, hydroformylations, hydroaminations, hydroaminomethylations, hydrocyanizations, hydrocarboxyalkylation, aminations, ammoxidation, oximations and hydrogenations may be carried out in the device.

In the device according to the invention, reactions are preferably carried out in which the catalyst is fed in with the liquid feedstock and is homogeneously dissolved in the liquid product/educt phase, such as for example the production of aldehydes and/or alcohols by hydroformylation of compounds with olefinic double bonds in the presence of cobalt or rhodium carbonyls, with or without the addition of ligands containing phosphorus.

The following examples are intended to explain the method according to the invention using the apparatus according to the invention, but without restricting the invention to this.

EXAMPLE 1

Comparative Example

Jet Loop Reactor H/D=6

In a jet loop reactor according to FIG. 4a with a volume of 10 l, a ratio of height to diameter (slenderness ratio) H/D=6 and the nozzle at the top, methyl 2-(hydroxymethyl)-acrylate in THF with a concentration of 0.1 mol/l and the catalyst precursor[Rh(COD)]BF$_4$ in a molar ratio of substrate (S) to catalyst (C) S/C=250 and the ligand (–)-2,3-bis[(2R,5R)-2,5-dimethylphospholano]-N-methylmaleimide(1,5-cyclooctadiene)rhodium(I) tetrafluoroborate, $C_{25}H_{39}BF_4NO_2P_2Rh$, (CatASium®-MN(S), Evonik Degussa GmbH) were mixed and reacted at 25° C. with a hydrogen partial pressure of 5 MPa and a residence time of 90 min. The product (methyl 2-hydroxymethylpropionate) was obtained with an enantiomer excess of 95% at full reaction. The reaction was found to be sensitive to the hydrogen partial pressure, lower pressures leading to increased byproduct formation by oligomerization of the substrate and dehydroxylation of the product.

EXAMPLE 2

According to the Invention

In the device according to the invention as depicted in FIG. 4b having two jet loop reactors arranged in parallel with a slenderness ratio of 10, each having a reaction volume of 5 l, the reaction was carried out according to the reaction conditions specified in Example 1. Full reaction could already be achieved after 75 min in the device according to the invention, an enantiomer excess of 95% being obtained. The hydrogen partial pressure could be reduced to 4 MPa, without significant byproduct formation being observable.

The examples show that when the reaction is carried out according to the invention in a device having two jet loop reactors interconnected in parallel, each with a slenderness ratio of 10, a substantial increase in the rate of reaction is possible with a simultaneously reduced hydrogen partial pressure in comparison with a single reactor having a slenderness ratio of 6.

LIST OF REFERENCES

1 jet nozzle
2 guide tube
3 baffle plate
4 double jacket
8 liquid distributor for driving jet medium
9 gas space for fresh gas supply
10 wall space for branchings for heat carrier
11 liquid manifold for driving jet medium
A driving jet medium inlet
B driving jet medium outlet
C heat carrier process connection
D heat carrier process connection
E fresh gas supply

The invention claimed is:

1. A device comprising:
   at least two jet loop reactors interconnected in parallel having common outer liquid recirculation.

2. The device according to claim 1, wherein the at least two jet loop reactors comprises a jet loop bundle reactor.

3. The device according to claim 1, wherein at least one of said jet loop reactors further comprising at least one jet loop bundle reactor.

4. The device according to claim 1, wherein in all the reactors nozzles are installed in an upper part of the reactor.

5. The device according to claim 1, wherein in all the reactors nozzles are installed in a lower part of the reactor.

6. The device according to claim 1, wherein in the reactors at least one nozzle is installed in a lower part of a reactor and at least one nozzle is installed in an upper part of a reactor.

7. The device according to claim 1, wherein an outlet for the liquid is assigned to each nozzle, in that the nozzle and the outlet are arranged diametrically in the reactor with respect to the internal liquid circuit, and in that the outer liquid recirculation connects the nozzle to the outlet.

8. The device according to claim 1, wherein precisely one pump is arranged in the outer liquid recirculation.

9. The device according to claim 1, wherein without a heat exchanger being installed inside the reactors a heat exchanger is provided in the outer liquid recirculation in order to exchange heat between the liquid conveyed in the outer liquid circuit and a heat carrier.

10. A method for reacting a first liquid with at least one second fluid, wherein the reaction is carried out in the device according to claim 1.

11. The method according to claim 10, wherein oxidations, epoxidation of olefins, hydroformylations, hydroaminations, hydroaminomethylations, hydrocyanizations, hydrocarboxyalkylation, aminations, ammoxidation, oximations and hydrogenations are carried out in the device.

12. The method according to claim 10, wherein at least one compound having at least one olefinic double bond is reacted by hydroformylation with a synthesis gas to form an aldehyde and/or an alcohol.

* * * * *